(12) United States Patent
Bernard et al.

(10) Patent No.: US 6,180,743 B1
(45) Date of Patent: Jan. 30, 2001

(54) ISOCYANATE MASKING PROCEDURE, USE OF OXIMES IN ISOCYANATE MASKING, MASKED ISOCYANATES AND THEIR USE IN MANUFACTURE OF COATING MATERIALS

(75) Inventors: Jean-Marie Bernard, Mornant; Eugénie Perroud, Lyons, both of (FR)

(73) Assignee: Rhodia Chimie, Courbevoie (FR)

( * ) Notice: Under 35 U.S.C. 154(b), the term of this patent shall be extended for 0 days.

(21) Appl. No.: 09/091,956

(22) PCT Filed: Dec. 27, 1998

(86) PCT No.: PCT/FR96/02090

§ 371 Date: Nov. 10, 1998

§ 102(e) Date: Nov. 10, 1998

(87) PCT Pub. No.: WO97/24386

PCT Pub. Date: Jul. 10, 1997

(30) Foreign Application Priority Data

Dec. 29, 1995 (FR) .................................. 95 15709

(51) Int. Cl.$^7$ ...................................................... C08G 18/80
(52) U.S. Cl. .......................................... 528/45; 252/182.2
(58) Field of Search ............................. 528/45; 252/182.2

(56) References Cited

PUBLICATIONS

Koth an daram et al; J. Polym. Sci., Art A: Poly. Chem. (1993) 31 (10) 2653—Abstract only.*
Querat et al; Angewandte Macromolekulare Chemie; Jun. 1994, v. 219, p. 185—Abstract only.*

* cited by examiner

Primary Examiner—Rachel Gorr
(74) Attorney, Agent, or Firm—Jean-Louis Seugnet

(57) ABSTRACT

This invention is aimed at a family of masked isocyanate, advantageously masked diisocyanate, and preferably masked polyisocyanate. This isocyanate is defined in that it carries at least one masked isocyanate function obtainable through the action on an isocyanate of an oxime in which the carbon of the oxime function is the carrier of at least one electron-attracting function. Applications: organic synthesis.

21 Claims, No Drawings

ISOCYANATE MASKING PROCEDURE, USE OF OXIMES IN ISOCYANATE MASKING, MASKED ISOCYANATES AND THEIR USE IN MANUFACTURE OF COATING MATERIALS

This application is an application under 35 U.S.C. Section 371 of International Application Number PCT/FR96/02090, filed on Dec. 27, 1996.

The present invention relates to new thermolabile protective groups for the isocyanate functional groups. It relates more particularly to a process for isocyanate masking, to the use of oximes for isocyanate masking, to masked isocyanates and to the use of the latter in the manufacture of coating.

In particular, the subject-matter of the present invention is molecular compounds constituting a unit, be it of mono-, oligo- or polymeric nature, carrying isocyanate groups, and capable of reacting with appropriate coreactants such as alcohols, phenols, amines, aminophenols or aminoalcohols, advantageously at least partially bi- or polyfunctional, which may be of mono-, oligo- or polymeric nature.

More precisely, the present invention relates to polyisocyanates in which at least some of the isocyanate functional groups are masked, or protected, by protective radicals, radicals which will sometimes be identified in the description which follows by the qualifier "masking" or "blocking".

The present invention also relates to some of the processes for obtaining these new masked polyisocyanates.

It furthermore relates to the use of the above masked polyisocyanates in compositions for the preparation of polymers, especially of polycondensates and of crosslinked products resulting from the reaction of the said protected polyisocyanates and of nucleophilic coreactants. This preparation is that which is exploited in industrial applications, such as the coatings of all kinds and especially those on textiles, on glasses, on papers, on metals and on materials of construction, and paints.

The usefulness of the masking of isocyanate functional groups (masking sometimes referred to as blocking), or even its need, is explained by an excessively high reactivity of isocyanates at ambient temperature towards some coreactants or towards a reactive solvent or of a, generally continuous, substrate phase in the case of emulsions or suspensions, such as water. This high reactivity is often very awkward, especially in the case of some applications of polyurethanes, in particular in paints, because this demands a separate packaging and sometimes handling of the isocyanate comonomer. This results in a processing which is not very convenient.

Thus, in all the applications of polyurethanes as coatings it is of the greatest interest to have available protected isocyanates in which the isocyanate functional group is made unreactive at ambient temperature towards its coreactants, but is kept reactive at a higher temperature.

These masked isocyanate units are advantageous on a number of counts. In the first place they make it possible to propose, in the same single packaging, compositions (including emulsions and suspensions) for obtaining a coating in which the isocyanate component is stable and not very sensitive to water. It follows that it is no longer necessary to employ costly anhydrous solvents which are specific for the isocyanates and that it is possible to store the masked isocyanates for a long time, without deterioration, in conditions in which those that are free would deteriorate.

Lastly, the use of masked polyisocyanates makes it possible to reduce, or even to eliminate, the possible toxic hazard associated with the presence of free and unstable isocyanates.

The improvement in this technique of masking the isocyanate functional groups in reactive mono-, oligo- or polymer units involves the optimization, generally a lowering, of the reaction temperature, that is to say that at which the deprotection takes place, thus resulting in the intended polymerization and/or crosslinking.

More specifically, the demasking temperature must be sufficiently high for there to be no risk of reaction during the storage period, and this reaction temperature must be sufficiently low for it to be easy to carry out the polycondensation when this is desired.

In general the temperature of "release" of the isocyanates, especially aliphatic (that is to say that the carbon carrying the nitrogen has $sp^3$ hybridization) is too high. This implies that an attempt is made to lower this temperature of release.

Such a lowering is reflected in economic savings which are not insignificant in energy and in process duration.

It is appropriate to mention, incidentally, that the masking groups employed in the case of aromatic isocyanates are generally not directly transposable to the aliphatic isocyanates, since the temperature of "release" for the same masking group is several tens of degrees centigrade higher than that of the aromatic isocyanates.

Many blocking radicals have already been employed. Among these there may be mentioned, among others, some triazoles, imidazolines, lactams, hydroxy-nitro compounds, sodium bisulphites, isocyanate dimers, phenols, esters of acetoacetic acid and alcohols. One of the most widely employed groups is the group of dialkylketoximes, which, however, has the major disadvantage of exhibiting a high release temperature, too high for many applications.

Among these masking agents, only those for which the octanol test gives a deblocking temperature of between approximately 100° C. (two significant figures) and 180° C. (two significant figures) are regarded as true masking agents.

It is appropriate to note that the multiplicity of the parameters makes it difficult to systematize some classes.

Thus, one of the essential objectives of the present invention is to provide new polyisocyanates with blocked functional groups and which have a relatively low temperature of dissociation for a limited period and with a dissociation yield that is compatible with polymerization techniques.

Another objective of the invention is to provide new polyisocyanates with blocked functional groups, which are not toxic or only slightly so.

Another objective of the invention is to provide new polyisocyanates with masked functional groups, which are not hazardous and/or tricky to handle and apply.

Another objective of the invention is to provide new polyisocyanates with blocked functional groups, which are economical.

Another objective of the invention is to provide new polyisocyanates with blocked functional groups, providing access to optionally crosslinked polymers (or rather to polycondensates), which satisfy the application specifications.

Another objective of the invention is to provide a process for obtaining such blocked polyisocyanates.

Another objective of the invention is to provide a process for the preparation of polymers and/or crosslinked products from the said blocked polyisocyanates.

Another aim of the present invention is to provide compositions comprising masked isocyanates of the above types.

Another aim of the present invention is to provide powder compositions of the abovementioned type.

Another aim of the present invention is to provide aqueous emulsions comprising isocyanates of the above type.

Another aim of the present invention is to provide suspensions comprising isocyanates of the above type.

These aims, and others which will appear subsequently, are attained by means of masked isocyanates, advantageously diisocyanates, preferably polyisocyanates. This compound carries at least one masked isocyanate functional group capable of being obtained by the action on a free isocyanate of a compound carrying an oxime functional group where the carbon of the oxime functional group carries at least one electron-attracting functional group.

More specifically, the substituents of the carbon of the oxime functional group, and especially the said electron-attracting functional group, are chosen so that the sum of the Hammett constants $\delta_p$ is at least equal to 0.2, advantageously to 0.25, preferably to 0.3. It is additionally desirable that the substituents of the carbon of the oxime functional group should be chosen so that the sum of the Hammett constants $\delta_p$ is at most equal to 1, advantageously 0.8, preferably 0.6.

To do this, at least one of the substituents of the carbon of the oxime functional group may be chosen from the electron-attracting functional groups exhibiting a Hammett constant $\delta_p$ at most equal to 0.8, advantageously 0.6, preferably 0.5.

The effect is above all related to the component $\delta_i$, and it is preferable that these inductive components should be chosen so that the sum of the Hammett constants $\delta_i$ is at least equal to 0.1, advantageously 0.15. It is additionally desirable that the substituents of the carbon of the oxime functional group should be chosen so that the sum of the Hammett constants $\delta_i$ is at most equal to 0.5, advantageously 0.4.

For more details on Hammett constants reference may be made to the third edition of the manual written by Professor Jerry March "Advanced Organic Chemistry" (pages 242 to 250) and published by John Wiley and Sons.

In most cases at least one of the substituents of the carbon of the oxime functional group will be chosen from those such as carbonyls, including carboxylates, esters and amides, nitrile, sulphones, including sulphonates, phosphones (that is to say: —P(O)=), including phosphonates and phosphinates, or even nitro (but the nitro group is often dangerous and too electron-attracting), ketone, ester and amide (above all N-disubstituted) functional groups, carbazide (protected, if appropriate, to prevent it from carrying another hydrogen as reactive as that in the oxime, cf. below), nitrile, onium, di(pseudo)halo (advantageously chloro, preferably fluoro), poly(pseudo)halomethyl (advantageously chloro, preferably fluoro), sulphone, sulphoxide, and aromatic nuclei which are electron-impoverished overall.

The orthoesters may be included among the ester functional groups and the ketal and acetal functional groups among the ketone functional groups.

It is desirable that at least one of the two, preferably both, atoms to which the carbon of the oxime functional group is attached should be carbons.

Thus, in the course of the study which has led to the present invention it was shown that the oximes possessing at least one electron-attracting group alpha to the carbon carrying the oxime, such as, for example, the oximes of alpha-ketoesters, lactones, amides or nitriles or ketones constitute a new class of thermolabile protective groups for the isocyanate functional groups. The other electron-attracting groups can be employed, as long as they do not perturb the various synthesis and release reactions.

The general structure of the oximes which give rise to protective or masking groups according to the present invention is the following:

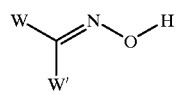

where at least one of the W and W' groups represents a functional group or an electron-attracting functional group or an electron-attracting group, such as described above, the other of the W and W' groups generally being a hydrocarbon radical, in particular an aryl (including alkylaryl) or alkyl radical.

Thus, more specifically, the preferred general structure of the oximes which give rise to protective or masking groups according to the present invention is the following:

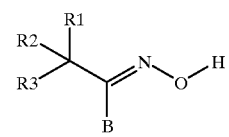

where B (corresponding to W) assumes especially the following values; the arrow indicates the place to which leads the bond between the carbon of the oxime and B

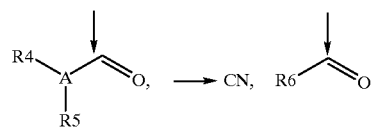

With $R_1$, $R_2$ and $R_3$=H or alkyl, including aralkyl or aryl, including alkylaryl, (hetero)cyclic or otherwise, With $R_4$=alkyl or aralkyl or aryl or heterocyclic and $R_5$ does not exist when A is chalcogen, provided that this does not involve any interfering reaction, especially when A is carbon, $R_4$ may be hydrogen [that is to say it is not a hydrogen as acidic as, or more acidic than, the mobile hydrogen of the oxime functional group (hydrogen carried by the oxygen of the oxime functional group, see below)].

A denotes a tetravalent atom (carbon, or even silicon) carrying a substituent [H or alkyl, including aralkyl, or aryl, including alkylaryl; (hetero)cyclic or otherwise], nitrogen (or even phosphorus), chalcogen, preferably light (sulphur and preferably oxygen).

With $R_4$ and $R_5$=H or alkyl or aralkyl or aryl or heterocyclic when A is equal to nitrogen, With $R_6$=alkyl, including aralkyl, or aryl or heterocyclic; as mentioned below, $R_6$ is advantageously subjected to restrictions, in particular that it must be such that the ketone is only enolisable with difficulty.

$R_1$, $R_2$ and $R_3$ may be linked together to form one or more rings.

$R_4$ and $R_5$ may be linked together to form a ring.

Also forming part of the invention are the oxime protective groups which have two electron-attracting groups (where W is advantageously B) which are similar or different, alpha to the carbon carrying the oxime.

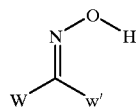

W and W', which are similar or different, denote the two substituents of the carbon of the oxime functional group; as already mentioned above, at least one of them is an electron-attracting group. It is desirable that W and W' should not be simultaneously aromatic (that is to say that an aromatic ring is linked directly to the carbon of the oxime functional group). When W or W' is aromatic it is also desirable that the sum of the Hammett constants $\delta_p$ of the substituents of the aromatic nucleus (that is to say the said aromatic nucleus directly linked to the carbon of the oxime functional group) should be lower than 0.5, preferably than 0.4.

Without it being possible to explain why, when the electron-attracting functional group is a ketone, it is preferable that this ketone should not be easily enolisable, that is to say that it is appropriate to avoid that, when the ketone acting electron-attractingly carries an alpha hydrogen, this hydrogen should be easily abstractable. The limit appears to be the acetyl functional group. In other words, when W and/or W' denotes a ketone functional group, it is desirable that this functional group should not be eynolisable more easily than the acetyl group CO—CH$_3$. This latter group is of course, not one of the preferred ones itself. This can be codified by indicating that, when W or W' is of the form —CO—CH<, the two (right) substituents are preferably electrodonating overall (it should be remembered that hydrogen is the reference and that its Hammett constant is, by definition, zero and that alkyls, strictly speaking, are considered to be electrodonating), that is to say that the sum of the Hammett constants $\delta_p$ of the two substituents (other than the carbonyl) carried by CH should be negative.

An additional, albeit not disqualifying, disadvantage of the monooximes of gem-diketones (vicinal diketones), especially symmetrical ones, stems from the fact that it is difficult to conduct a monooximation and that gem-dioximes are not among the preferred compounds either [because they are conjugated (and can consequently be chromophoric) and produce compounds whose reactivity is not always easy to control].

Optionally, W' and B, at least one of which is electron-attracting, are linked together and are such that the oxime has a cyclic structure, if appropriate with one or more hetero atoms in order to form a heterocyclic ring whose structure may be symbolized as follows:

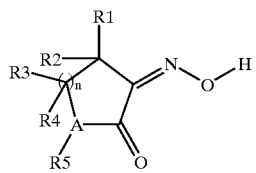

With R1, R2, R3, R4 and R5 defined as above and it being possible for n to assume whole values between 0 and 3.

The reactivity and the temperature of deblocking of the protected isocyanate can be modified by varying the groups R1, R2, R3, A, R4, R5 and R6.

In general, these oximes which are employed as masking agent for isocyanates must contain neither functional groups that would be liable to perturb the synthesis of the masked isocyanates nor functional groups that would be liable to perturb the ability to be retained in storage conditions without loss of quality, nor functional groups that would be liable to perturb the condensation reactions in the chosen temperature conditions.

In addition, the accessibility to the oxime functional group must be as good as possible. It is thus preferable that at least one of the two carbons in a vicinal position to that of the oxime functional group should not form a hindering group (in other words that it should not constitute a tertiary carbon with its substituents).

If it is desired to avoid the creation of bonds other than that between the isocyanate functional group and the oxime functional group, it is appropriate to prevent the said compound carrying the oxime functional group from possessing another functional group containing reactive hydrogen [or, at the very least, that this reactive hydrogen should be significantly less reactive than that of the oxime functional group]. Thus, the condition is then that the substituents, and especially the electron-attracting functional groups, should not contain a hydrogen that is as acidic as, or more acidic than, the mobile hydrogen of the oxime functional group (hydrogen carried by the oxygen of the oxime functional group).

The periodic classification of the elements employed in the present application is that from the supplement to the Bulletin de la Société Chimique de France, January 1966, No. 1.

The optional substituents of the oxime may be diverse and may be chosen among the most diverse substituents, provided that they meet those of the above conditions which are obligatory. The said oxime, the masking agent for isocyanates according to the invention, generally has at most 50 carbon atoms, advantageously at most 25, and preferably at most 15 carbon atoms, per oxime functional group. Among the oximes employed during the present study, those that were the most practical ones to employ had from 2 to 6 carbon atoms per oxime functional group according to the present invention.

Aldehyde oximes give results that are markedly less good than those of ketone oximes.

The preferred electron-attracting functional groups are those which comprise a carbonyl and derive from the acid functional group. Thus, the compounds which exhibit the oxime of a derivative of an α-ketoacid (in particular the derivatives of pyruvic acids) not carrying reactive hydrogen (see infra) (such as amide, imide, carboxylate or ester) are particularly well suited.

As already mentioned above, the isocyanates concerned may be mono-, di- or even polyisocyanates. These derivatives may contain structures of isocyanurate type, also called trimer, uretidinedione structures, also called dimer, biuret or allophanate structures or a combination of structures of this type in a single molecule or as a mixture.

The isocyanate monomers may be:
  aliphatic, including cycloaliphatic and arylaliphatic, such as:
    polymethylene diisocyanates and especially hexamethylene diisocyanate,
    isophorone diisocyanate,
    arylenedialkylene diisocyanates (such as OCN—CH$_2$-Φ-CH$_2$—NCO), or else aromatic, such as tolylene diisocyanate.

The preferred polyisocyanates aimed at by the masking technique of the invention are those in which at least one, advantageously two, preferably three of the following conditions are met:

at least one, advantageously two, of the free NCO functional groups or NCO functional groups to be protected are linked to a hydrocarbon backbone through the intermediacy of a saturated ($sp^3$) carbon;

at least one, advantageously two, of the said saturated ($sp^3$) carbons carries at least one, advantageously two, hydrogen(s) (in other words, it has been found that better results were obtained when the carbon carrying the isocyanate functional group carried a hydrogen, preferably two hydrogens); it is additionally even preferable that at least one third, advantageously at least half, preferably at least two thirds, of the said saturated ($sp^3$) carbons should be linked to the said backbone by a carbon atom itself carrying at least one hydrogen, more preferably two;

all the carbons through the intermediacy of which the isocyanate functional groups are linked to the hydrocarbon backbone are saturated ($sp^3$) carbons, which are advantageously partially, preferably totally, carriers of a hydrogen, preferably of two hydrogens; it is additionally even preferable that at least one third, advantageously at least half, preferably at least two thirds, of the said saturated ($sp^3$) carbons should be linked to the said backbone by a carbon atom itself carrying at least one hydrogen, more preferably two.

When the polyisocyanates are relatively heavy, that is to say when they comprise at least 4 advantageously masked isocyanate functional groups, or else when there is present a mixture of a number of compounds carrying isocyanate functional group(s), the starting conditions become:

at least one third, advantageously two thirds, preferably four fifths, of the free NCO functional groups or NCO functional groups to be protected are linked to a hydrocarbon backbone through the intermediacy of a saturated ($sp^3$) carbon;

at least one third, advantageously two thirds, preferably four fifths, of the said saturated ($sp^3$) carbons carries at least one, advantageously two, hydrogen(s) (in other words it has been found that better results were obtained when the carbon carrying the isocyanate functional group carried a hydrogen, preferably two hydrogens);

it is additionally even preferable that at least one third, advantageously at least half, preferably at least two thirds, of the said saturated ($sp^3$) carbons should be linked to the said backbone by a carbon atom itself carrying at least one hydrogen, advantageously two;

mixtures in which (virtually) all the free or masked isocyanate functional groups correspond to the above criteria are particularly targeted.

In addition mixtures or compounds which exhibit at least partially (at least a fifth by mass relative to the free or masked NCO functional groups, advantageously a third, preferably half [the comparison is easy because the backbones in question originate or are capable of originating from isocyanate functional groups]) an isocyanuric and/or biuret backbone (regardless of whether this backbone originates from a single or from a number of monomers, see below) and more precisely structures of isocyanurate type, also called trimer, uretidinedione structures, also known as dimer, biuret or allophanate structures or a combination of structures of this type in a single molecule or as a mixture are particularly well suited.

Thus the invention relates especially to the use of the said oximes for masking all or a portion of the isocyanate functional groups of a polyisocyanate, that is to say a compound which has a number of isocyanate functional groups. The functional groups not masked according to the present invention may be either free or masked by other masking groups. The masking groups according to the present invention are particularly well suited for the protection of those of the isocyanate groups that are aliphatic and, among the latter, those in which the carbon carrying the nitrogen of the isocyanate functional group is saturated ($sp^3$) and carries a hydrogen, preferably two hydrogens.

In general the isocyanate compositions employed are mixtures of various molecules resulting from polymerization or polycondensation, in which case what has just been explained above concerning what is preferred applies with fractional and statistical values. In this case it may be indicated that it is desirable that, expressed as (free plus blocked) isocyanate functional group, and not taking into account the weight of blocking agent, it should have an isocyanate functional group content of between 1 and 35%, advantageously 2 and 25%, preferably between 5 and 20%.

When it is desired to mask an isocyanate functional group of aromatic nature, that is to say in which the nitrogen is linked to a carbon with ($sp^2$) hybridization, it is appropriate that the substituents of the carbon carrying the oxime functional group should be less electron-attracting, that is to say that it should be situated in the least electron-attracting portion of the ranges referred to above in order to obtain values which correspond to the above general criteria. Thus, in general, in the case of aromatic isocyanates, the sum of the Hammett constants $\delta_p$ is at most equal to 0.45, advantageously 0.35, preferably 0.3.

To ensure a good storage life it is preferable to choose masked isocyanate functional groups for which the octanol test shows a "release" at 80° C., advantageously at 90° C., of at most 90%.

For uses in organic solvent, in suspension or in aqueous emulsion, it is desirable to choose masked isocyanate functional groups for which the octanol test shows a "release" at 150° C., advantageously at 140° C., preferably 130° C., of at most 90%.

The isocyanates concerned may be mono-, di- or even polyisocyanates. These derivatives may contain structures of isocyanurate type, also called trimer, uretidinedione structures, also called dimer, biuret or allophanate structures or a combination of structures of this type in a single molecule or as a mixture.

The technique of preparation of the masked isocyanates from isocyanates is a simple adaptation of the techniques employing the usual oximes such as methyl ethyl ketoxime (sometimes referred to by its acronym of MEKO) and which produces the MEKO masked trimer which is sold under the trademark Tolonate D2 and is used for the comparative examples.

Let it be remembered that oximes add to isocyanate functional groups, the hydrogen going to the nitrogen while the oxygen is grafted to the carbon of the carbonyl:

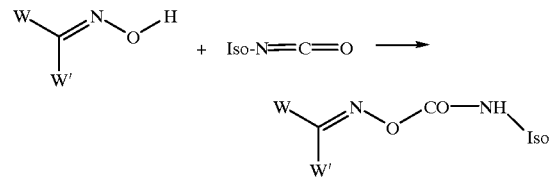

Iso represents the remainder of the molecule of the isocyanate, which advantageously comprises, as was described previously, at least one, preferably at least 2, other isocyanate group(s).

By way of teaching by example, a description will be given below, employing as paradigm the masking of the compounds referred to in the technical field by the name of hexamethylene diisocyanate trimers such as those marketed under the registered trademark "Tolonates® HDT"; these compounds are produced from hexamethylene diisocyanate by a cyclic trimerization of three isocyanate functional groups to give an isocyanuric ring and, in fact, also include various other polymers, like pentamers (in which a hexamethylene diisocyanate has both its isocyanate functional groups involved in an isocyanuric ring) and such as uretidinedione (dimer).

Thus, in the examples where the masking of the trimers by methyl and ethyl pyruvate oximes is described, a person skilled in the art will be able to find operating details for adapting the techniques employed with dialkyl ketone oximes to those according to the invention and thus to avoid possible routine tests.

The synthesis of these oximes is known to a specialist in the subject.

Reference may be made especially to the thesis of Mr Claude Mercier, upheld in Paris before a jury presided over by Professor Marc Julia.

One of the many advantages of the new polyisocyanates according to the invention is that they can be used as bases for the preparation of polymers and/or crosslinked products and may be employed especially as one of the main constituents of coatings of all kinds, such as varnishes and paints. In such uses the hardness properties of the crosslinkable polymers form part of those that are sought after technically and are functional.

The abovementioned process for the preparation of polymers comprises the following stages:

bringing a polyisocyanate protected according to the invention (I) into contact with a coreactant which contains derivatives which have reactive hydrogens in the form of alcohol, phenol, thiol and some amines, including anilines; these derivatives may have hydrocarbon backbones which are aliphatic, alicyclic or aromatic, preferably alkyl, including cycloalkyl and aralkyl, aryl, linear or branched, substituted or otherwise; (these coreactants, generally polyols, are themselves known) [and may form the layer (spreading it) or the form according to the application]

and heating the reaction mixture thus formed to a temperature which is slightly elevated in relation to the usual techniques; this may be either an elevated temperature for a short time or a low temperature for a long time.

The first case corresponds to the technique often referred to as "coil coating" and corresponds to a period of at most 15 minutes at 180° and at most 5 minutes at 200° C. with, in addition, good resistance to colour formation (in general yellowing) in the cases where over-cooking might occur.

At the other extreme there is milder cooking, in general to a temperature of at most 160° C. for a period of at most two hours, more often of at most one hour.

The temperature is advantageously at most equal to 150° C., preferably between 80 and 140° C. and, more preferably still, between 110 and 130° C., this being for a period shorter than or equal to 15 h, preferably 10 h and, more preferably still, 8 h.

Provision may be made for including an organic solvent in the reaction mixture. A suspension in water may also be envisaged.

This optional solvent is preferably weakly polar, that is to say its dielectric constant is barely higher than or equal to 4 or more preferably to 5.

In accordance with the invention the preferred weakly polar solvents are, among others, aromatics such as benzene, chlorobenzene (1,2-dichlorobenzene), nitrobenzene, ketones such as cyclohexanone, methyl ethyl ketone and acetone, light-alkyl esters and especially adipic esters.

The derivatives forming part of the composition of the coreactant are generally di-, oligo- or polyfunctional, may be monomeric or originating from di-, oligo- or polymerization, and are used for the preparation of optionally crosslinked polyurethanes; their choice would be dictated by the functionalities which are expected for the polymer in the final application and by their reactivity.

It is preferred to avoid employing derivatives which have reactive hydrogens and catalyse the release of the masked isocyanate, especially when it is desired to have stable "two-component" compositions (that is to say simultaneously containing both reactants: the isocyanate which is here at least partially masked according to the invention and the compound containing reactive hydrogen). Thus, among the amines it is preferred to employ only those that do not catalyse the decomposition or the transamidation of the masked isocyanate functional groups according to the present invention.

These coreactants are generally well known to the person skilled in the art.

The invention therefore also relates to paint compositions including for successive or simultaneous addition:

a masked polyisocyanate according to the invention;

a coreactant containing reactive hydrogen as described above;

optional catalysts, themselves known in the case of the oximes and especially those based on tin;

optionally at least one pigment;

optionally titanium dioxide;

optionally an aqueous phase;

optionally a surface-active agent for maintaining the constituent compounds of the mixture in emulsion or in suspension;

optionally an organic solvent;

optionally a dehydrating agent.

The invention also relates to paints and varnishes obtained by the use of these compositions with the optional release according to the above process.

Octanol Test

Definitions

"release" (or "deblocking")

temperature: this is the lowest temperature at which the masking agent of the masked isocyanate is displaced to a level of 9/10 (mathematically rounded off) by a primary monoalcohol (the primary alcohol is generally octanol).

storage life: To ensure a good storage life, it is preferable to choose masked isocyanate functional groups for which the octanol test shows a "release" at 80° C., advantageously at 90° C., not greater than 90%.

Progress of the reaction: The reaction is regarded as complete if it is carried out to greater than 90%.

Procedure

Approximately 5 mmol of protected masked NCO equivalent to be evaluated are charged to a Schott-type tube with magnetic stirring.

2.5 to 3 ml of 1,2-dichlorobenzene (solvent) and the equivalent of 1-octanol (5 mmol, i.e. 0.61 g and optionally with the catalyst to be tested with the masking group) are added.

The reaction mixture is subsequently brought to the test temperature. Heating is then carried out for 6 h at the test temperature, so as to deblock and thus render reactive the isocyanate functional groups. On completion of the reaction, the solvent is removed by vacuum distillation and the residue is analysed by NMR, mass and infrared spectroscopy.

The percentage of masked isocyanate functional group condensed with 1-octanol is evaluated from this data.

The following nonlimiting examples illustrate the invention.

EXAMPLE NO. 1

Synthesis of Methyl Pyruvate Oxime

This oxime was prepared according to the procedure described in Vogel's Practical Organic Chemistry, 5th edition, published by Longman Scientific and Technical, p. 1259. The pyruvatoximes have also been described in Synthetic Communications, 22 (22) 3263–3269 (1992).

Into a three-necked round bottom flask are charged, successively, 5 g of methyl pyruvate (0.049 mol) (CAS RN: 600-22-6), 50 g of ethanol, 5 g of hydroxylamine hydrochloride (0.0719 mol) and 7.26 g of triethylamine (0.0719 mol). The reaction mixture is heated to 80° C. After 1 h 30 min the reaction mixture is concentrated to 3/4 in the rotary evaporator. After addition of 50 cc of distilled water and cooling to 0° C., methyl pyruvate oxime precipitates. The precipitate is filtered off.

Another treatment procedure enables the product to be obtained. At the end of the reaction the reaction mixture is concentrated, the residue is taken up with 100 cc of ethyl acetate. The triethylamine hydrochloride precipitate is removed by filtration. The organic phase is concentrated and the oxime formed crystallizes.

The quantity of oxime which is recovered is 2.72 g and is analysed by NMR, mass and infrared spectroscopy. The corresponding spectra are shown in Appendix 1.

It should be noted that performing the reaction in ethanol as solvent results in a reaction of transesterification of the oxime ester; this is why the presence of ethyl and methyl ester is observed.

EXAMPLE NO. 2

Synthesis of Ethyl Pyruvate Oxime (Often Referred to Hereinafter by its Pet Name: "POME")

Into a three-necked flask are charged, successively, 25 g of ethyl pyruvate (0.215 mol), 70 cc of ethanol, 25 g of hydroxylamine hydrochloride (0.36 mol) and 36.33 g of triethylamine (0.36 mol). The reaction is refluxed for 2 hours. Ethanol is removed by vacuum distillation and the solid residue is then taken up with ethyl acetate. The triethylamine hydrochloride is filtered off. The organic phase is concentrated to give 4 g of oxime.

The reaction has not been optimized.

EXAMPLE NO. 3

Synthesis of Tolonates® Masked With Oximes see below

EXAMPLE NO. 4

Synthesis of Tolonate® HDT Blocked With Methyl Pyruvate Oxime

Into a three-necked flask are charged, successively, 1.63 g of Tolonate® HDT ($8.54 \cdot 10^{-3}$ mol of NCO isocyanate functional group), 30 cc of toluene and 1.098 g ($8.54 \cdot 10^{-3}$ mol) of BJ 349 (methyl pyruvate oxime). After 3 hours' reaction at 50° C. infrared analysis shows that all the NCO functional groups have been substituted. The solvent is then evaporated off under vacuum.

This product is given reference XD2G.

EXAMPLE NO. 5

Synthesis of Tolonate® HDT Blocked With Ethyl Pyruvate Oxime

The operating procedure is identical with that shown above.

EXAMPLE NO. 6

Deblocking Reaction of the Blocked Tolonates®

A test was developed which is representative of the "release" properties of the isocyanate functional group, which makes it possible to compare the deblocking temperatures of the blocked Tolonates®.

6.1) Definition of the Octanol Test

Into a 50 cc Schott tube are introduced, successively, 0.517 g of Tolonate blocked with methyl pyruvate, 0.219 g of 1-octanol (same molar concentration as of protected NCO functional group) and 5.02 g of dichlorobenzene. The reaction mixture is next heated to the test temperature (to 100° C. in the present example) for 6 hours. When the reaction is finished, the solvent is removed by vacuum distillation and the residue is analysed by NMR, mass and infrared.

6.2) Results 6.2.1 Case of Methyl Pyruvate Oxime Blocked Tolonate® HDT.

The percentage of deblocking and formation of expected octyl carbamate is 80%, whereas, in the same conditions, a Tolonate® blocked with methyl ethyl ketoxime is not deprotected and does not give any octyl carbamate.

6.2.2 Case of Ethyl Pyruvate Oxime Blocked Tolonate® HDT.

The percentage of deblocking and formation of expected octyl carbamate is 47% whereas, in the same conditions, a Tolonate® blocked with methyl ethyl ketoxime is not deprotected and does not give any octyl carbamate.

The test gives a highly favourable indication concerning the ability of the masked product to be stored for a long time.

Conclusion From the Tests

It has been shown that electron-impoverished oximes and especially those of the alpha-ketoesters, amides or nitriles can be good protective groups for isocyanate functional groups capable of being thermally regenerated at low temperature. Isocyanates blocked with such groups produce a carbamate-forming reaction by reaction with 1-octanol at low temperature, from 100° C. onwards, and this constitutes a particularly important advantage in the new generation of paints referred to as "single-component".

EXAMPLE NO. 7

Comparative Tests of Preparation of Paints and Varnishes

TOLONATE XD2G (POME blocked HDT) Evaluation in comparison with Tolonate D2 (MEKO blocked HDT)

I. Study as varnish:

The polyol employed is an acrylic resin from Henkel, G-Cure 105P70 (OH content=3.06% on dry basis and solids content=70.2%): cf. technical data sheet P-303 of September 1993.

Tolonate D2 is delivered at a solids content of 74% in Solvesso 100, with an NCO content of 11.2% on the product as such.

XD2G has a solids content of 75% in Solvesso 100, with an NCO content of 13.08% as delivered.

Varnishes with NCO/OH=1.08 and a solids content of 50% are prepared with 0.05% of DBTL on dry basis and without catalyst:

|  | without catalyst | with DBTL | without catalyst | with DBTL |
|---|---|---|---|---|
| G-Cure 105 P 70 | 22.78 | 22.78 | 23.86 | 23.86 |
| Isocyanate | 11.62 | 11.62 | 10.43 | 10.43 |
| Solvent* | 15.60 | 14.35 | 15.71 | 14.46 |
| DBTL (1% solution) | — | 1.25 | — | 1.25 |

*The solvent consists of a mixture of 57% of EEP (ethyl 3-ethoxypropionate), 40% of Solvesso 100 and 3% of Rhodiasolve RPDE.

\*: The solvent consists of a mixture of 57% of EEP (ethyl 3-ethoxypropionate), 40% of Solvesso 100 and 3% of Rhodiasolve RPDE.

After 15 minutes of mixing and then 15 minutes of debubbling, films are applied with the automatic film-spreader (approximately 50 μm dry) onto glass sheets and are passed through the oven at different times and different temperatures.

1.1) Deblocking Temperature:

The deblocking temperature is evaluated by measuring the Persoz hardness and by the test for the resistance to the MEK (methyl ethyl ketone) drop.

Persoz hardness (in seconds):

|  | Controls (with D2) | | Formulae with XD2G | |
|---|---|---|---|---|
| Cure | without catalyst | with DBTL | without catalyst | with DBTL |
| 30 min at 140° C. | 156" | 265" | 349" | 400" |
| 20 min at 150° C. | 136" | 244" | 342" | 403" |
| 30 min at 150° C. | 253" | 384" | 396" | 401" |
| 40 min at 150° C. | 324" | 399" | 400" | 397" |
| 30 min at 160° C. | 383" | 397" | 401" | 396" |

With this information alone it can be stated that Tolonate D2 is crosslinked after 30 min at 160° C. without catalyst and after 30 min at 150° C. with 0.05% of DBTL, and that XD2G is crosslinked after 30 min at 150° C. without catalyst and after 30 min at 140° C. with DBTL.

These first estimates can be refined using the MEK resistance of the film:

|  | Controls (with D2) | | Formulae with XD2G | |
|---|---|---|---|---|
| Cure | without catalyst | with DBTL | without catalyst | with DBTL |
| 30 min at 140° C. | 3 | 2 | 2 | 1 |
| 20 min at 150° C. | 3 | 1 | 2 | 1 |
| 30 min at 150° C. | 2 | 1 | 1 | 1–0 |
| 40 min at 150° C. | 2–1 | 0–1 | 1 | 1–0 |
| 30 min at 160° C. | 1 | 1 | 1 | 1–0 |

The scoring ranges from 5 (film completely attacked) to 0 (no visible trace).

By employing the two tables above, it is therefore possible to give the following results:

|  | D2 | XD2G |
|---|---|---|
| without catalyst | 30' at 160° C. | 30' at 150° C. |
| with 0.05% of DBTL/dry | 30/40' at 150° C. | 30' at 140° C. |

These values were confirmed by a subsequent study carried out by no longer employing a traditional ventilated oven and by carrying out cures at different times and temperatures, but on a gradient oven from the company BYK Gardner.

1.2) Yellowing on Curing:

The yellowing is measured with the Minolta spectrocolorimeter using the yellowing index, on films stoved at different times at 200° C.

|  | Controls (with D2) | | Formulae with XD2G | |
|---|---|---|---|---|
| Cure | without catalyst | with DBTL | without catalyst | with DBTL |
| 30 min at 150° C. | 3.21 | 3.26 | 3.45 | 3.44 |
| 15 min at 200° C. | 4.39 | 4.42 | 4.18 | 4.51 |
| 30 min at 200° C. | 7.47 | 8.65 | 7.69 | 7.46 |
| 60 min at 200° C. | 13.64 | 18.13 | 13.28 | 12.90 |

Tolonate D2 and XD2G exhibit comparable yellowing indices when the films contain no catalyst. However, in practice, the formulators employ it in the majority of cases. In the presence of DBTL, XD2G tends to yellow much less on overcuring than D2.

II. Study as Paint:

A white paint formulation representative of coil-coating, inspired by a DSM Resins guidance formulation (cf. sheet 92/12-F12) was prepared:

|  | Product | Mass | Supplier | Designation |
|---|---|---|---|---|
| 1 | Uralac SN 830 S2-60 | 181.63 | DSM Resins | polyester resin |
| 2 | Solvesso 150 | 39.60 | Esso | solvent |
| 3 | Dowanol PnB | 13.20 | Dow Chemicals | solvent |
| 4 | Disperbyk 160 + xylene (50/50) | 9.51 | BYK | dispersant |
| 5 | Rhoditan RL 60 | 327.35 | Rhône-Poulenc | TiO$_2$ pigment |
|  | Milling then addition | | | |
| 6 | Uralac SN 830 S2-60 | 285.10 | DSM Resins | polyester resin |
| 7 | 50% DBTL in Solvesso 100 | 1.37 | Adriss | catalyst |
| 8 | Solvesso 150 | 87.51 | Esso | solvent |
| 9 | Dowanol PnB | 29.17 | Dow Chemicals | solvent |
| 10 | BYK 358 | 4.44 | BYK | tension agent |
| 11 | Rhodiasolve | 21.12 | Rhône-Poulenc | spreading agent |
|  | RPDE | 1000.00 | | |

Uralac SN 830 is a saturated polyester of low OH content (approximately 1% on dry basis), with a solids content of 60% in Solvesso 150, very flexible (TG=26° C.) of relatively low molecular weight (Mn=4500), manufactured by DSM Resins (cf. technical data sheet 92/12-F12).

Application:

Disperse ingredients 1 to 5 with stirring in the order shown. After incorporation of titanium oxide maintain high stirring (approximately 2000 rev/min) for about 10 minutes.

Milling with the aid of glass micro-beads is next performed until a fineness higher than 8 on the North gauge is obtained. The remainder (ingredients 6 to 11) are then added in the order shown, with stirring. The isocyanate is lastly added to the white base in order to have NCO/OH=1.05:

|  | Control (with D2) | Paint with XD2G |
|---|---|---|
| White base | 1000.00 g | 1000.00 g |
| Isocyanate | 67.65 g | 57.93 g |

After 15 min of mixing and 15 min of debubbling, films are applied with the aid of an applicator onto steel panels (approximately 50 µm dry).

Tolonate D2 and Tolonate XD2G were tested with overcuring in this paint in prelacquer conditions (very rapid passage in an oven at 300° C.). The yellowing index was subsequently measured, it being known that the control is crosslinked after 50' whereas the paint with XD2G is crosslinked after 40':

| Cure | Control (with D2) | Paint with XD2G |
|---|---|---|
| 40" in oven at 300° C. | 2.48 | 1.40 |
| 50" in oven at 300° C. | 3.22 | 1.89 |
| 60" in oven at 300° C. | 4.21 | 3.03 |
| 75" in oven at 300° C. | 5.89 | 4.04 |
| 90" in oven at 300° C. | 7.92 | 6.01 |

It is therefore XD2G that gives the best results (lower yellowing on overcuring).

What is claimed is:

1. An isocyanate, diisocyanate, or polyisocyanate, carrying at least one masked isocyanate functional group obtainable by the action on an isocyanate of a compound carrying an oxime where the carbon of the oxime functional group carries substituents comprising at least one electron-attracting functional group, with the further proviso that, if there are 2 electron-attracting functional groups, they are not simultaneously aromatic and with the further proviso that said electron-attracting functional group is not a ketone.

2. An isocyanate, diisocyanate, or polyisocyanate according to claim 1, wherein the substituents of the carbon of the oxime functional group, have Hammett constants the sum of which is at least equal to 0.2.

3. An isocyanate, diisocyanate, or polyisocyanate according to claim 2, wherein the sum is at least equal to 0.3.

4. An isocyanate, diisocyanate, or polyisocyanate according to claims 2, wherein the sum of the Hammett constants is at most equal to 1.

5. An isocyanate, diisocyanate, or polyisocyanate according to claim 4, wherein the sum of the Hammett constants is at most equal to 0.6.

6. An isocyanate, diisocyanate, or polyisocyanate according to claim 2, wherein at least one of the electron-attracting functional groups exhibits a Hammett constant at most equal to 0.8.

7. An isocyanate, diisocyanate, or polyisocyanate according to claim 6, wherein the Hammett constant is at most equal to 0.5.

8. An isocyanate, diisocyanate, or polyisocyanate according to claim 1, wherein at least one of the substituents of the carbon of the oxime functional group is an ester, amide, nitrile, onium, dihalo, polyhalomethyl, sulphone, sulphoxide functional group, or an aromatic nucleus which is electron-impoverished overall.

9. A process for the crosslinking of a paint, comprising the step of adding to said paint an isocyanate, diisocyanate, or polyisocyanate as defined in claim 1.

10. A composition comprising at least one compound carrying at least two isocyanate functional groups, at least one of said isocyanate functional groups being a masked isocyanate functional group obtained by the action on an isocyanate of a compound carrying an oxime where the carbon of the oxime functional group carries at least one electron-attracting functional group, with the further proviso that, if there are 2 electron-attracting functional groups, they are not simultaneously aromatic and with the further proviso that said electron-attracting functional group is not a ketone.

11. A composition according to claim 10 further comprising at least one compound carrying at least three isocyanate functional groups which are at least partially masked.

12. A composition according to claim 10, exhibiting a mean functionality (number of isocyanate functional group, masked or unmasked, per molecule containing it) greater than 2 and at most equal to 5.

13. A composition according to claim 12, wherein the mean functionality is greater than 2.1 and at most equal to 4.

14. A composition according to claim 13, wherein the mean functionality is at least equal to 2.4.

15. A composition according to claim 13, wherein the mean functionality is at most equal to 3.7.

16. A composition according to claim 10, meeting at least one of the following conditions:
at least one third of the free or masked NCO functional groups are linked to a hydrocarbon backbone through the intermediacy of a saturated (sp$^3$) carbon;
at least one third of the said saturated (sp$^3$) carbons carries at least one hydrogen(s); and
at least one third, of the said saturated (sp$^3$) carbons is linked to said backbone by a carbon atom carrying at least one hydrogen(s).

17. A composition according to claim 11, meeting at least one of the following conditions:
at least four fifths, of the free or masked NCO functional groups are linked to a hydrocarbon backbone through the intermediacy of a saturated (sp$^3$) carbon;
at least four fifths, of the said saturated (sp$^3$) carbons carries at least two hydrogen(s); and
at least two thirds, of the said saturated (sp$^3$) carbons is linked to said backbone by a carbon atom carrying at least two hydrogen(s).

18. A coating composition comprising a composition as defined in claim 10, and a reactant containing reactive hydrogen.

19. A coating composition according to claim 18, further comprising an aqueous phase.

20. A composition according to claim 19, further comprising at least one demasking catalyst.

21. An isocyanate, diisocyanate, or polyisocyanate according to claim 1, which is aliphatic.

* * * * *